(12) United States Patent
Moses et al.

(10) Patent No.: US 8,382,639 B2
(45) Date of Patent: Feb. 26, 2013

(54) CONTROL SYSTEM FOR A DUAL CLUTCH TRANSMISSION

(75) Inventors: Robert L. Moses, Ann Arbor, MI (US); Bret M. Olson, Whitelake, MI (US); Philip C. Lundberg, Keego Harbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 561 days.

(21) Appl. No.: 12/635,561

(22) Filed: Dec. 10, 2009

(65) Prior Publication Data

US 2010/0190606 A1 Jul. 29, 2010

Related U.S. Application Data

(60) Provisional application No. 61/146,936, filed on Jan. 23, 2009.

(51) Int. Cl.
 *B60W 10/00* (2006.01)
 *F16H 61/26* (2006.01)
 *F16H 61/00* (2006.01)
 *F16H 61/14* (2006.01)

(52) U.S. Cl. ........... 477/70; 477/156; 477/158; 477/168

(58) Field of Classification Search ............ 477/52, 477/70, 79, 156, 158, 166, 168; 74/330
See application file for complete search history.

(56) References Cited

U.S. PATENT DOCUMENTS

| | | | | |
|---|---|---|---|---|
| 8,105,203 | B2 * | 1/2012 | Ishii et al. | 477/127 |
| 2009/0242302 | A1 * | 10/2009 | Fujiki | 180/89.12 |
| 2011/0132711 | A1 * | 6/2011 | Czoykowski et al. | 192/48.601 |
| 2011/0132716 | A1 * | 6/2011 | Czoykowski et al. | 192/85.01 |
| 2011/0198180 | A1 * | 8/2011 | Momal et al. | 192/3.58 |

FOREIGN PATENT DOCUMENTS

DE 10134115 A1 1/2003

* cited by examiner

Primary Examiner — Tisha Lewis (57) ABSTRACT

A hydraulic control system for a dual clutch transmission includes a plurality of solenoids and valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the solenoids allows for a pressurized fluid to activate at least one of the clutch actuators and synchronizer actuators in order to shift the transmission into a desired gear ratio.

21 Claims, 8 Drawing Sheets

CONTROL SYSTEM FOR A DUAL CLUTCH TRANSMISSION

CROSS-REFERENCE TO RELATED APPLICATIONS

This application claims the benefit of U.S. Provisional Application No. 61/146,936, filed on Jan. 23, 2009, which is hereby incorporated in its entirety herein by reference.

TECHNICAL FIELD

The invention relates to a control system for a dual clutch transmission, and more particularly to an electro-hydraulic control system having a plurality of solenoids and valves operable to actuate a plurality of actuators within the dual clutch transmission.

BACKGROUND

A typical multi-speed, dual clutch transmission uses a combination of two friction clutches and several dog clutch/synchronizers to achieve "power-on" or dynamic shifts by alternating between one friction clutch and the other, with the synchronizers being "pre-selected" for the oncoming ratio prior to actually making the dynamic shift. "Power-on" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

While previous hydraulic control systems are useful for their intended purpose, the need for new and improved hydraulic control system configurations within transmissions which exhibit improved performance, especially from the standpoints of efficiency, responsiveness and smoothness, is essentially constant. Accordingly, there is a need for an improved, cost-effective hydraulic control system for use in a dual clutch transmission.

SUMMARY

A hydraulic control system for a dual clutch transmission includes a plurality of solenoids and valves in fluid communication with a plurality of clutch actuators and with a plurality of synchronizer actuators. The clutch actuators are operable to actuate a plurality of torque transmitting devices and the synchronizer actuators are operable to actuate a plurality of synchronizer assemblies. Selective activation of combinations of the solenoids allows for a pressurized fluid to activate at least one of the clutch actuators and synchronizer actuators in order to shift the transmission into a desired gear ratio.

In one aspect of the present invention, the hydraulic control system includes an electric pump and an accumulator that provide a pressurized hydraulic fluid.

In another aspect of the present invention, the hydraulic control system includes two variable force solenoids in communication with an electric pump and an accumulator.

In yet another aspect of the present invention, the hydraulic control system includes two variable force solenoids in communication with the electric pump and the accumulator, two variable force solenoids or variable flow solenoids in communication with the two clutch actuating devices, and two variable force solenoids or variable flow solenoids in communication with two valve assemblies.

Further objects, aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
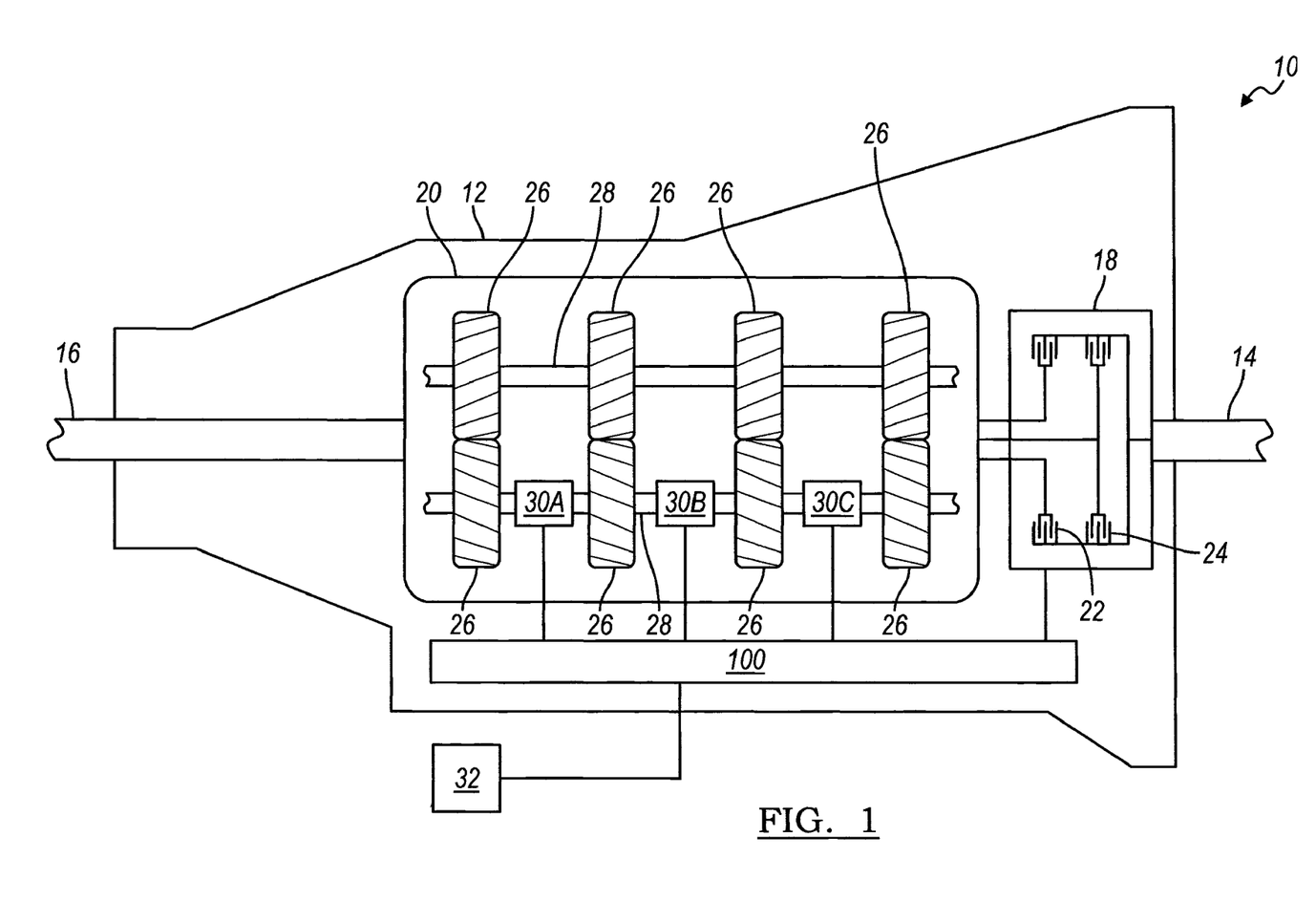
FIG. 1 is a schematic diagram of an exemplary dual clutch automatic transmission incorporating a hydraulic control system according to the principles of the present invention.

With reference to FIG. 1, an exemplary dual clutch automatic transmission incorporating the present invention is illustrated and generally designated by the reference number 10. The dual clutch transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, a dual clutch assembly 18, and a gear arrangement 20. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and drives the dual clutch assembly 18. The dual clutch assembly 18 preferably includes a pair of selectively engageable torque transmitting devices including a first torque transmitting device 22 and a second torque transmitting device 24. The torque transmitting devices 22, 24 are preferably dry clutches. The torque transmitting devices 22, 24 are mutually exclusively engaged to provide drive torque to the gear arrangement 20.

The gear arrangement 20 includes a plurality of gear sets, indicated generally by reference number 26, and a plurality of shafts, indicated generally by reference number 28. The plurality of gear sets 26 includes individual intermeshing gears that are connected to or selectively connectable to the plurality of shafts 28. The plurality of shafts 28 may include layshafts, countershafts, sleeve and center shafts, reverse or idle shafts, or combinations thereof. It should be appreciated that the specific arrangement and number of the gear sets 26 and the specific arrangement and number of the shafts 28 within the transmission 10 may vary without departing from the scope of the present invention.

The gear arrangement 20 further includes a first synchronizer assembly 30A, a second synchronizer assembly 30B, and a third synchronizer assembly 30C. The synchronizer assemblies 30A-C are operable to selectively couple individual gears within the plurality of gear sets 26 to the plurality of shafts 28. Each synchronizer assembly 30A-C is disposed either adjacent certain single gears or between adjacent pairs of gears within adjacent gear sets 26. Each synchronizer assembly 30A-C, when activated, synchronizes the speed of a gear to that of a shaft and a positive clutch, such as a dog or face clutch. The clutch positively connects or couples the gear to the shaft. The clutch is bi-directionally translated by a shift rail and fork assembly (not shown) within each synchronizer assembly 30A-C.

The transmission also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of the dual clutch assembly 18 and the synchronizer assemblies 30A-C via a hydraulic control system 100 according to the principles of the present invention.

Figure 2A:
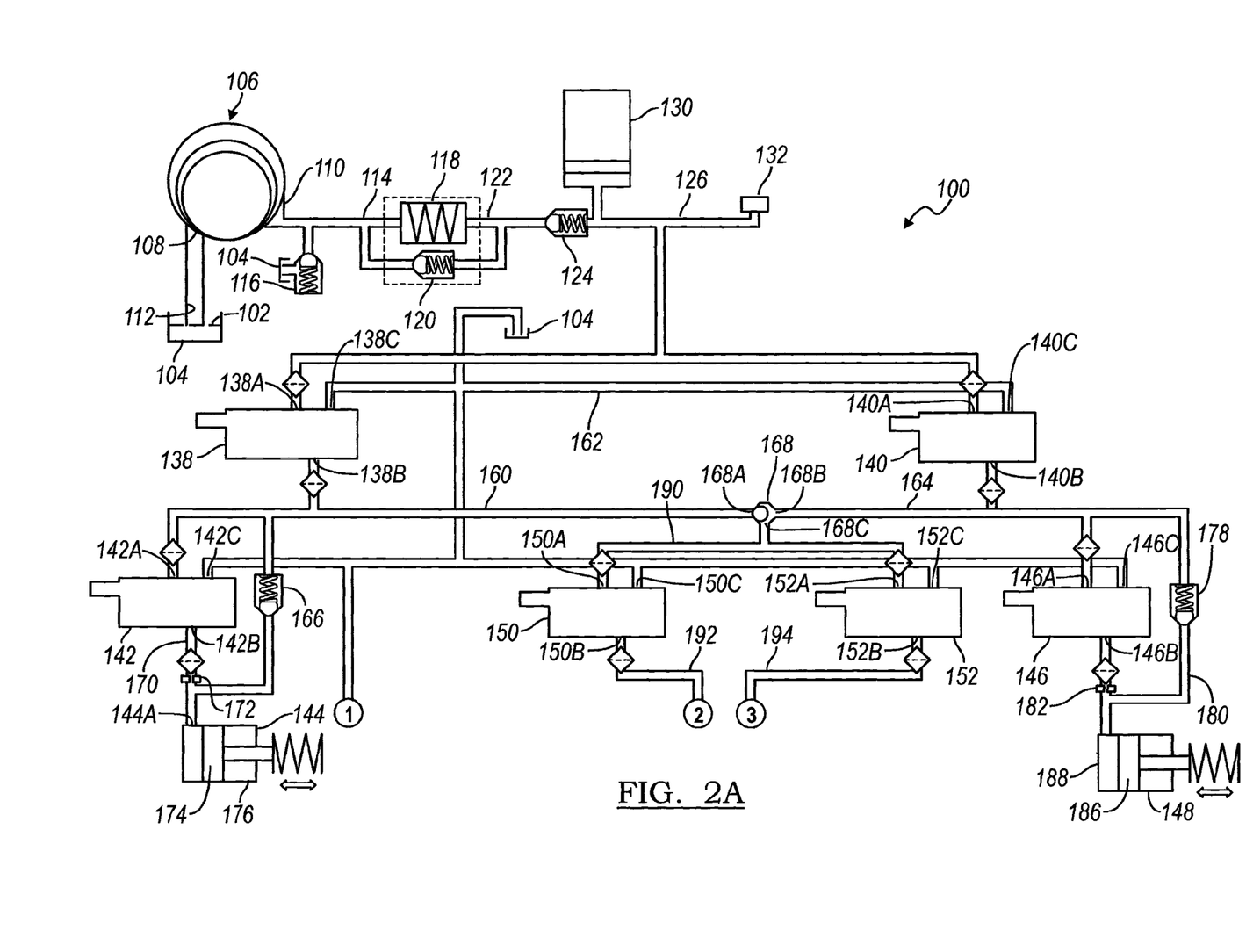
FIG. 2 is a schematic diagram of an embodiment of a hydraulic control system for a dual clutch transmission according to the principles of the present invention.
Figure 2B:
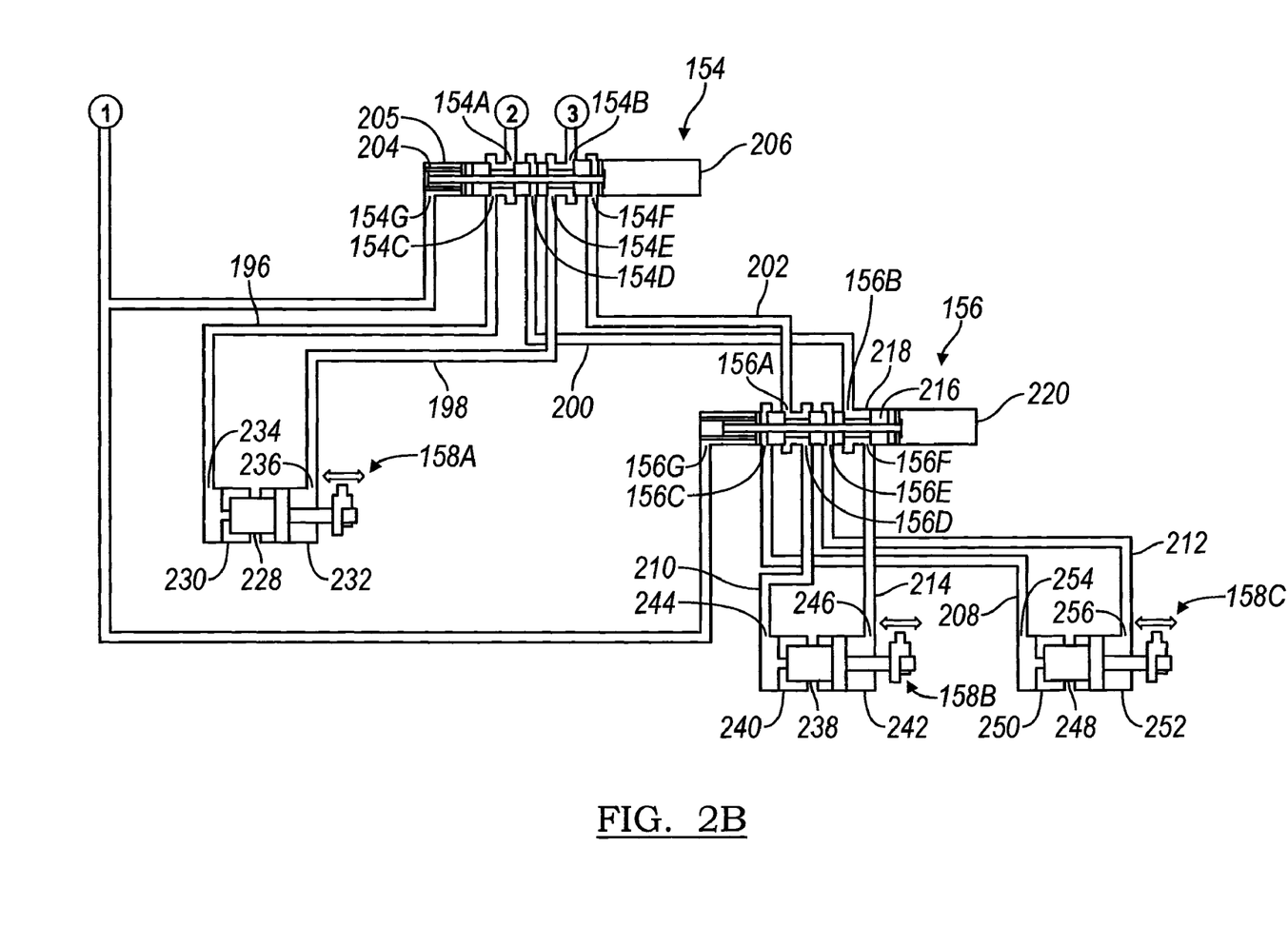

Turning to FIG. 2, the hydraulic control system 100 of the present invention is operable to selectively engage the dual clutch assembly 18 and the synchronizer assemblies 30A-C by selectively communicating a hydraulic fluid 102 from a sump 104 to a plurality of shift actuating devices, as will be described in greater detail below. The sump 104 is a tank or reservoir preferably disposed at the bottom of the transmission housing 12 to which the hydraulic fluid 102 returns and collects from various components and regions of the automatic transmission 10. The hydraulic fluid 102 is forced from the sump 104 and communicated throughout the hydraulic control system 100 via a pump 106. The pump 106 is preferably driven by an electric engine (not shown) and may be, for example, a gear pump, a vane pump, a gerotor pump, or any other positive displacement pump. The pump 106 includes an inlet port 108 and an outlet port 110. The inlet port 108 communicates with the sump 104 via a suction line 112. The outlet port 110 communicates pressurized hydraulic fluid 102 to a supply line 114. The supply line 114 is in communication with a spring biased blow-off safety valve 116, a pressure side filter 118, and a spring biased check valve 120. The spring biased blow-off safety valve 116 communicates with the sump 104. The spring biased blow-off safety valve 116 is set at a relatively high predetermined pressure and if the pressure of the hydraulic fluid 102 in the supply line 114 exceeds this pressure, the safety valve 116 opens momentarily to relieve and reduce the pressure of the hydraulic fluid 102. The pressure side filter 118 is disposed in parallel with the spring biased check valve 120. If the pressure side filter 118 becomes blocked or partially blocked, pressure within supply line 114 increases and opens the spring biased check valve 120 in order to allow the hydraulic fluid 102 to bypass the pressure side filter 118.

The pressure side filter 118 and the spring biased check valve 120 each communicate with an outlet line 122. The outlet line 122 is in communication with a second check valve 124. The second check valve 124 is in communication with a main supply line 126 and is configured to maintain hydraulic pressure within the main supply line 126. The main supply line 126 supplies pressurized hydraulic fluid to an accumulator 130 and a main pressure sensor 132. The accumulator 130 is an energy storage device in which the non-compressible hydraulic fluid 102 is held under pressure by an external source. In the example provided, the accumulator 130 is a spring type or gas filled type accumulator having a spring or compressible gas that provides a compressive force on the hydraulic fluid 102 within the accumulator 130. However, it should be appreciated that the accumulator 130 may be of other types, such as a gas-charged type, without departing from the scope of the present invention. Accordingly, the accumulator 130 is operable to supply pressurized hydraulic fluid 102 back to the main supply line 126. However, upon discharge of the accumulator 130, the second check valve 124 prevents the pressurized hydraulic fluid 102 from returning to the pump 106. The accumulator 130, when charged, effectively replaces the pump 106 as the source of pressurized hydraulic fluid 102, thereby eliminating the need for the pump 106 to run continuously. The main pressure sensor 132 reads the pressure of the hydraulic fluid 102 within the main supply line 126 in real time and provides this data to the transmission control module 32.

The hydraulic control system 100 further includes a plurality of solenoids and valves that direct the pressurized hydraulic fluid 102 delivered from the pump 106 or accumulator 130 via the main supply line 126 to a plurality of actuation devices. More specifically, the hydraulic control system 100 includes a first pressure control solenoid 138, a second pressure control solenoid 140, a first clutch solenoid 142, a first clutch piston 144, a second clutch solenoid 146, a second clutch piston 148, first synchronizer solenoid 150, a second synchronizer solenoid 152, a first valve assembly 154, a second valve assembly 156, a first synchronizer actuator 158A, a second synchronizer actuator 158B, and a third synchronizer actuator 158C.

The first pressure control solenoid 138 and the second pressure control solenoid 140 branches or bifurcates the hydraulic control system 100 into two separate flow paths. This initial bifurcation, before any gear or clutch selection or activation components, essentially splits the control system 100 into two separate control systems. This is advantageous not only from a control standpoint since if only one side of the transmission 10 is active, only the clutch and gears on one shaft can possibly be selected but also its failure mode is desirable since failure of a component on one side of the transmission will affect only that side of the transmission and the control system, clutch and gears on the other side of the transmission will, in all likelihood, still be available to provide limited operation and mobility.

The first pressure control solenoid 138 is preferably an electrically controlled variable force solenoid. The first pressure control solenoid 138 includes an inlet port 138A that communicates with an outlet port 138B when the first pressure control solenoid 138 is activated or energized and includes an exhaust port 138C that communicates with the outlet port 138B when the first pressure control solenoid 138 is inactive or de-energized. Variable activation of the first pressure control solenoid 138 regulates or controls the pressure of the hydraulic fluid 102 as the hydraulic fluid 102 communicates from the inlet port 138A to the outlet port 138B. The inlet port 138A is in communication with the main supply line 126. The outlet port 138B is in communication with a first manifold 160. The exhaust port 138C is in communication with an exhaust line 162 that communicates with the sump 104. In an alternate embodiment, the first pressure control solenoid 138 may be replaced with a feed limit valve and an on/off solenoid.

The second pressure control solenoid 140 is preferably an electrically controlled variable force solenoid. The second pressure control solenoid 140 includes an inlet port 140A that communicates with an outlet port 140B when the second pressure control solenoid 140 is activated or energized and includes an exhaust port 140C that communicates with the outlet port 140B when the second pressure control solenoid 140 is inactive or de-energized. Variable activation of the second pressure control solenoid 140 regulates or controls the pressure of the hydraulic fluid 102 as the hydraulic fluid 102 communicates from the inlet port 140A to the outlet port 140B. The inlet port 140A is in communication with the main supply line 126. The outlet port 140B is in communication with a second manifold 164. The exhaust port 140C is in communication with the exhaust line 162. In an alternate embodiment, the second pressure control solenoid 140 may be replaced with a feed limit valve and an on/off solenoid.

The first manifold 160 communicates the hydraulic fluid 102 from the first pressure control solenoid 138 to the first clutch control solenoid 142, to a first pressure limit control valve 166, and to a ball check valve 168. The first clutch control solenoid 142 is preferably an electrically controlled variable flow solenoid, but can be a variable force solenoid, that is operable to actuate the first torque transmitting device 22, as will be described in greater detail below. The first clutch control solenoid 142 includes an inlet port 142A that communicates with an outlet port 142B when the first clutch control solenoid 142 is activated or energized and includes an exhaust port 142C that communicates with the outlet port 142B when the first clutch control solenoid 142 is inactive or de-energized. Variable activation of the first clutch control solenoid 142 regulates or controls the pressure of the hydraulic fluid 102 as the hydraulic fluid 102 communicates from the inlet port 142A to the outlet port 142B. The inlet port 142A is in communication with the first manifold 160. The outlet port 142B is in communication with a first clutch supply line 170. The exhaust port 142C is in communication with the exhaust line 162. The first pressure limit control valve 166 is disposed in parallel with the first clutch control solenoid 142 and is in communication with the first clutch supply line 170. If pressure within the first clutch supply line 170 exceeds a predetermined value, the first pressure limit control valve 166 opens to relieve and reduce the pressure.

The first clutch supply line 170 communicates through a flow restriction orifice 172 with an inlet port 144A in the first clutch piston assembly 144. The first clutch piston assembly 144 includes a single acting piston 174 slidably disposed in a cylinder 176. The piston 174 translates under hydraulic pressure to engage the first torque transmitting device 22, shown in FIG. 1. When the first clutch control solenoid 142 is activated or energized, pressurized hydraulic fluid 102 is provided to the first clutch supply line 170. The pressurized hydraulic fluid 102 is communicated from the first clutch supply line 170 to the first clutch piston assembly 144 where the pressurized hydraulic fluid 102 translates the piston 174, thereby engaging the first torque transmitting device 22. When the first clutch control solenoid 142 is de-energized, the inlet port 142A is closed and hydraulic fluid from the cylinder 176 passes from the outlet port 142B to the exhaust port 142C and into the sump 104, thereby disengaging the first torque transmitting device 22.

The second manifold 164 communicates the hydraulic fluid 102 from the second pressure control solenoid 140 to the second clutch control solenoid 146, to a second pressure limit control valve 178, and to the ball check valve 168. The second clutch control solenoid 146 is preferably an electrically controlled variable flow solenoid, but can be a variable force solenoid, that is operable to actuate the second torque transmitting device 24, as will be described in greater detail below. The second clutch control solenoid 146 includes an inlet port 146A that communicates with an outlet port 146B when the second clutch control solenoid 146 is activated or energized and includes an exhaust port 146C that communicates with the outlet port 146B when the second clutch control solenoid 146 is inactive or de-energized. Variable activation of the second clutch control solenoid 146 regulates or controls the pressure of the hydraulic fluid 102 as the hydraulic fluid 102 communicates from the inlet port 146A to the outlet port 146B. The inlet port 146A is in communication with the second manifold 164. The outlet port 146B is in communication with a second clutch supply line 180. The exhaust port 146C is in communication with the exhaust line 162. The second pressure limit control valve 178 is disposed in parallel with the second clutch control solenoid 146 and is in communication with the second clutch supply line 180. If pressure within the second clutch supply line 180 exceeds a predetermined value, the second pressure limit control valve 178 opens to relieve and reduce the pressure.

The second clutch supply line 180 communicates through a flow restriction orifice 182 with an inlet port 148A in the second clutch piston assembly 148. The second clutch piston assembly 148 includes a single acting piston 186 slidably disposed in a cylinder 188. The piston 186 translates under hydraulic pressure to engage the second torque transmitting device 24, shown in FIG. 1. When the second clutch control solenoid 146 is activated or energized, pressurized hydraulic fluid 102 is provided to the second clutch supply line 180. The pressurized hydraulic fluid 102 is communicated from the second clutch supply line 180 to the second clutch piston assembly 146 where the pressurized hydraulic fluid 102 translates the piston 186, thereby engaging the second torque transmitting device 24. When the second clutch control solenoid 146 is de-energized, the inlet port 146A is closed and hydraulic fluid from the cylinder 188 passes from the outlet port 146B to the exhaust port 146C and into the sump 104, thereby disengaging the second torque transmitting device 24.

The ball check valve 168 is a control device that is disposed between the first manifold 160 and the second manifold 164. The ball check valve 168 includes a first inlet port 168A, a second inlet port 168B, and an outlet port 168C. The first inlet port 168A is in communication with the first manifold 160. The second inlet port 168B is in communication with the second manifold 164. The outlet port 168C is in communication with a third manifold 190. The ball check valve 168 closes off whichever of the inlet ports 168A, 168B that is delivering the lower hydraulic pressure and provides communication between whichever of the inlet ports (168A, 168B) having or delivering the higher hydraulic pressure and the outlet port 168C.

The third manifold 190 communicates pressurized hydraulic fluid 102 to the first synchronizer solenoid 150 and the second synchronizer solenoid 152. More specifically, the first synchronizer solenoid 150 is preferably an electrically controlled variable force solenoid, but can be a variable flow solenoid. The first synchronizer solenoid 150 is operable to control the pressure of hydraulic fluid 102 delivered to one side of each of the synchronizer actuators 158A-C, as will be described in greater detail below. The first synchronizer solenoid 150 includes an inlet port 150A that communicates with an outlet port 150B when the first synchronizer solenoid 150 is activated or energized and includes an exhaust port 150C that communicates with the outlet port 150B when the first synchronizer solenoid 150 is inactive or de-energized. Variable activation of the first synchronizer solenoid 150 regulates or controls the pressure of the hydraulic fluid 102 as the hydraulic fluid 102 communicates from the inlet port 150A to the outlet port 150B. The inlet port 150A is in communication with the third manifold 190. The outlet port 150B is in communication with an intermediate line 192. The exhaust port 150C is in communication with an exhaust line 162.

The second synchronizer solenoid 152 is preferably an electrically controlled variable force solenoid, but can be a variable flow solenoid. The second synchronizer solenoid 152 is operable to control the pressure of hydraulic fluid 102 delivered to another side of each of the synchronizer actuators 158A-C, as will be described in greater detail below. The second synchronizer solenoid 152 includes an inlet port 152A that communicates with an outlet port 152B when the second synchronizer solenoid 152 is activated or energized and includes an exhaust port 152C that communicates with the outlet port 152B when the second synchronizer solenoid 152 is inactive or de-energized. Variable activation of the second synchronizer solenoid 152 regulates or controls the pressure of the hydraulic fluid 102 as the hydraulic fluid 102 communicates from the inlet port 152A to the outlet port 152B. The inlet port 152A is in communication with the third manifold 190. The outlet port 152B is in communication with an intermediate line 194. The exhaust port 152C is in communication with an exhaust line 162.

The first valve assembly 154 is in communication with both the first and second synchronizer solenoids 150, 152 via the intermediate lines 192 and 194. The first valve assembly 154 is operable to direct pressurized hydraulic fluid 102 from the first and second synchronizer solenoids 150, 152 to the first synchronizer actuator 158A and to the second valve assembly 156, as will be described in greater detail below. The first valve assembly 154 includes a first inlet port 154A, a second inlet port 154B, a first outlet port 154C, a second outlet port 154D, a third outlet port 154E, a fourth outlet port 154F, and an exhaust port 154G. The first inlet port 154A is in communication with intermediate line 192. The second inlet port 154B is in communication with intermediate line 194. The first outlet port 154C is in communication with a synchronizer supply line 196. The second outlet port 154D is in communication with a synchronizer supply line 198. The third outlet port 154E is in communication with an intermediate line 200. The fourth outlet port 154F is in communication with an intermediate line 202. The exhaust port 154G is in communication with the exhaust line 162.

The first valve assembly 154 further includes a valve 204 slidably disposed within a bore 205. The valve 204 is moveable between two positions by a direct acting solenoid 206. When the direct acting solenoid 206 is energized, the valve 204 is moved to a first position, as illustrated in FIG. 2. When the direct acting solenoid 206 is de-energized, a return spring (not shown) moves the valve 204 to a second position. When the valve 204 is in the first position, the first inlet port 154A is in communication with the first outlet port 154C, the second inlet port 154B is in communication with the third outlet port 154E, and the second and fourth outlet ports 154D, 154F are in communication with the exhaust port 154G. When the valve 204 is in the second position, the first inlet port 154A is in communication with the second outlet port 154D, the second inlet port 154B is in communication with the fourth outlet port 154F, and the first and third outlet ports 154C, 154E are in communication with the exhaust port 154G. Accordingly, when the direct acting solenoid 206 is energized and the valve 204 is in the first position, pressurized hydraulic fluid 102 from the first and second synchronizer solenoids 150, 152 is communicated to the first synchronizer actuator 158A. When the direct acting solenoid 206 is de-energized and the valve 204 is in the second position, pressurized hydraulic fluid 102 from the first and second synchronizer solenoids 150, 152 is communicated to the second valve assembly 156.

The second valve assembly 156 is operable to direct pressurized hydraulic fluid 102 from the first and second synchronizers 150, 152 to the second synchronizer actuator 158B and to the third synchronizer actuator 158C, as will be described in greater detail below. The second valve assembly 156 includes a first inlet port 156A, a second inlet port 156B, a first outlet port 156C, a second outlet port 156D, a third outlet port 156E, a fourth outlet port 156F, and an exhaust port 156G. The first inlet port 156A is in communication with intermediate line 202. The second inlet port 156B is in communication with intermediate line 200. The first outlet port 156C is in communication with a synchronizer supply line 208. The second outlet port 156D is in communication with a synchronizer supply line 210. The third outlet port 156E is in communication with an intermediate line 212. The fourth outlet port 156F is in communication with an intermediate line 214. The exhaust port 156G is in communication with the exhaust line 162.

The second valve assembly 156 further includes a valve 216 slidably disposed within a bore 218. The valve 216 is moveable between two positions by a direct acting solenoid 220. When the direct acting solenoid 220 is energized, the valve 216 is moved to a first position. When the direct acting solenoid 220 is de-energized, a return spring (not shown) moves the valve 216 to a second position, as illustrated in FIG. 2. When the valve 216 is in the first position, the first inlet port 156A is in communication with the first outlet port 156C, the second inlet port 156B is in communication with the third outlet port 156E, and the second and fourth outlet ports 156D, 156F are in communication with the exhaust port 154G. When the valve 216 is in the second position, the first inlet port 156A is in communication with the second outlet port 156D, the second inlet port 156B is in communication with the fourth outlet port 156F, and the first and third outlet ports 156C, 156E are in communication with the exhaust port 156G. Accordingly, when the direct acting solenoid 220 is energized and the valve 216 is in the first position, pressurized hydraulic fluid 102 from the first and second synchronizer solenoids 150, 152 is communicated to the third synchronizer actuator 158C. When the direct acting solenoid 220 is de-energized and the valve 216 is in the second position, pressurized hydraulic fluid 102 from the first and second synchronizer solenoids 150, 152 is communicated to the second synchronizer actuator 158B.

The synchronizer actuators 158A-C are preferably three-area piston assemblies operable to each engage or actuate a shift rail in a synchronizer assembly, but can be two-area piston assemblies. More specifically, the first synchronizer actuator 158A is operable to actuate the first synchronizer assembly 30A, the second synchronizer actuator 158B is operable to actuate the second synchronizer assembly 30B, and the third synchronizer actuator 158C is operable to actuate the third synchronizer assembly 30C. The first synchronizer actuator 158A includes a first piston 228 and a second piston 230. The pistons 228, 230 are slidably disposed within a piston housing or cylinder 232. The pistons 228, 230 present three separate areas for pressurized hydraulic fluid to act upon. The first piston 228 engages or contacts a finger lever or other shift rail component of the first synchronizer assembly 30A. The first synchronizer actuator 158A includes a fluid port 234 that communicates with one end of the first piston 228 and with the second piston 230 and includes a fluid port 236 that communicates with an opposite end of the first piston 228. Fluid port 234 is in communication with synchronizer supply line 196 and fluid port 236 is in communication with synchronizer supply line 198. Accordingly, the pressurized hydraulic fluid 102 communicated from the first valve assembly 154 enters the first synchronizer actuator 158A through the fluid ports 234, 236 and contacts the pistons 228, 230. The difference in pressure between the hydraulic fluid delivered to fluid port 234 from the first synchronizer control solenoid 150 and the hydraulic fluid delivered to fluid port 236 from the second synchronizer solenoid 152 moves the pistons 228, 230 between various positions. Each position in turn corresponds to a position of the shift rail of the first synchronizer assembly 30A (i.e., engaged left, engaged right, and neutral).

The second synchronizer actuator 158B includes a first piston 238 and a second piston 240. The pistons 238, 240 are slidably disposed within a piston housing or cylinder 242. The pistons 238, 240 present three separate areas for pressurized hydraulic fluid to act upon. The first piston 238 engages or contacts a finger lever or other shift rail component of the second synchronizer assembly 30B. The second synchronizer actuator 158B includes a fluid port 244 that communicates with one end of the first piston 238 and with the second piston 240 and includes a fluid port 246 that communicates with an opposite end of the first piston 238. Fluid port 244 is in communication with synchronizer supply line 210 and fluid port 246 is in communication with synchronizer supply line 214. Accordingly, the pressurized hydraulic fluid 102 communicated from the second valve assembly 156 enters the second synchronizer actuator 158B through the fluid ports 244, 246 and contacts the pistons 238, 240. The difference in pressure between the hydraulic fluid delivered to fluid port 244 from the second synchronizer control solenoid 152 and the hydraulic fluid delivered to fluid port 246 from the first synchronizer solenoid 150 moves the pistons 238, 240 between various positions. Each position in turn corresponds to a position of the shift rail of the second synchronizer assembly 30B (i.e., engaged left, engaged right, and neutral).

Finally, the third synchronizer actuator 158C includes a first piston 248 and a second piston 250. The pistons 248, 250 are slidably disposed within a piston housing or cylinder 252. The pistons 248, 250 present three separate areas for pressurized hydraulic fluid to act upon. The first piston 248 engages or contacts a finger lever or other shift rail component of the third synchronizer assembly 30C. The third synchronizer actuator 158C includes a fluid port 254 that communicates with one end of the first piston 248 and with the second piston 250 and includes a fluid port 256 that communicates with an opposite end of the first piston 248. Fluid port 254 is in communication with synchronizer supply line 208 and fluid port 256 is in communication with synchronizer supply line 212. Accordingly, the pressurized hydraulic fluid 102 communicated from the second valve assembly 156 enters the third synchronizer actuator 158C through the fluid ports 254, 256 and contacts the pistons 248, 250. The difference in pressure between the hydraulic fluid delivered to fluid port 254 from the second synchronizer control solenoid 152 and the hydraulic fluid delivered to fluid port 256 from the first synchronizer solenoid 150 moves the pistons 248, 250 between various positions. Each position in turn corresponds to a position of the shift rail of the first synchronizer assembly 30A (i.e., engaged left, engaged right, and neutral).

During general operation of the hydraulic control system 100, the accumulator 130 provides the pressurized hydraulic fluid 102 throughout the system and the pump 106 is employed to charge the accumulator 130. Selection of a particular forward or reverse gear ratio is achieved by selectively actuating one of the torque transmitting devices 22, 24 and selectively actuating one of the synchronizer assemblies 30A-C. It should be appreciated that which actuator assembly 30A-C and which torque transmitting device 22, 24 provide which forward or reverse gear ratio may vary without departing from the scope of the present invention. To engage or actuate the first torque transmitting device 22, the first pressure control solenoid 138 and the first clutch control solenoid 142 are energized. To engage or actuate the second torque transmitting device 24, the second pressure control solenoid 140 and the second clutch control solenoid 146 are energized.

To actuate the first synchronizer assembly 30A, one of the first and second pressure control solenoids 138, 140 are energized and the first valve assembly 154 is placed in the first position. In addition, one of the first and second torque transmitting devices 22, 24 are engaged as described above. Bi-directional translation of the first synchronizer assembly 30A is then achieved by selectively energizing the synchronizer solenoids 150, 152. For example, synchronizer solenoid 150 is energized to move the first synchronizer actuating assembly 158A and therefore the first synchronizer assembly 30A to a first engaged position, synchronizer solenoid 152 is energized to move the first synchronizer actuating assembly 158A and therefore the first synchronizer assembly 30A to a second engaged position, and both synchronizer solenoids 150, 152 are energized to provide a neutral position.

To actuate the second synchronizer assembly 30B, one of the first and second pressure control solenoids 138, 140 are energized, the first valve assembly 154 is placed in the second position, and the second valve assembly 156 is placed in the second position. In addition, one of the first and second torque transmitting devices 22, 24 are engaged as described above. Bi-directional translation of the second synchronizer assembly 30B is then achieved by selectively energizing the synchronizer solenoids 150, 152. For example, synchronizer solenoid 150 is energized to move the second synchronizer actuating assembly 158B and therefore the second synchronizer assembly 30B to a first engaged position, synchronizer solenoid 152 is energized to move the second synchronizer actuating assembly 158B and therefore the second synchronizer assembly 30A to a second engaged position, and both synchronizer solenoids 150, 152 are energized to provide a neutral position.

To actuate the third synchronizer assembly 30C, one of the first and second pressure control solenoids 138, 140 are energized, the first valve assembly 154 is placed in the second position, and the second valve assembly 156 is placed in the first position. In addition, one of the first and second torque transmitting devices 22, 24 are engaged as described above. Bi-directional translation of the third synchronizer assembly 30C is then achieved by selectively energizing the synchronizer solenoids 150, 152. For example, synchronizer solenoid 150 is energized to move the third synchronizer actuating assembly 158C and therefore the third synchronizer assembly 30C to a first engaged position, synchronizer solenoid 152 is energized to move the third synchronizer actuating assembly 158C and therefore the third synchronizer assembly 30C to a second engaged position, and both synchronizer solenoids 150, 152 are energized to provide a neutral position.

Figure 3A:
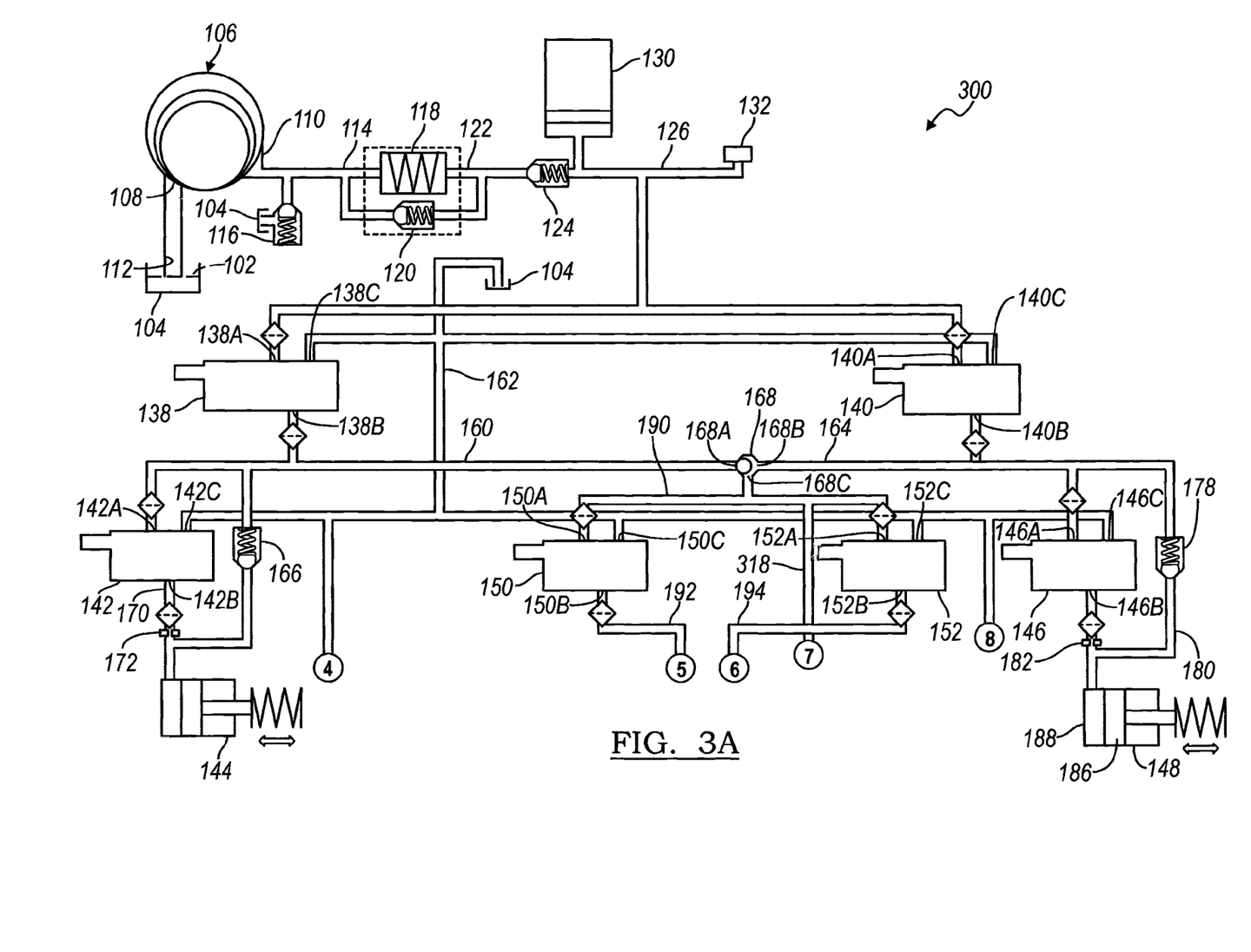
FIG. 3 is a schematic diagram of another embodiment of a hydraulic control system for a dual clutch transmission according to the principles of the present invention.
Figure 3B:
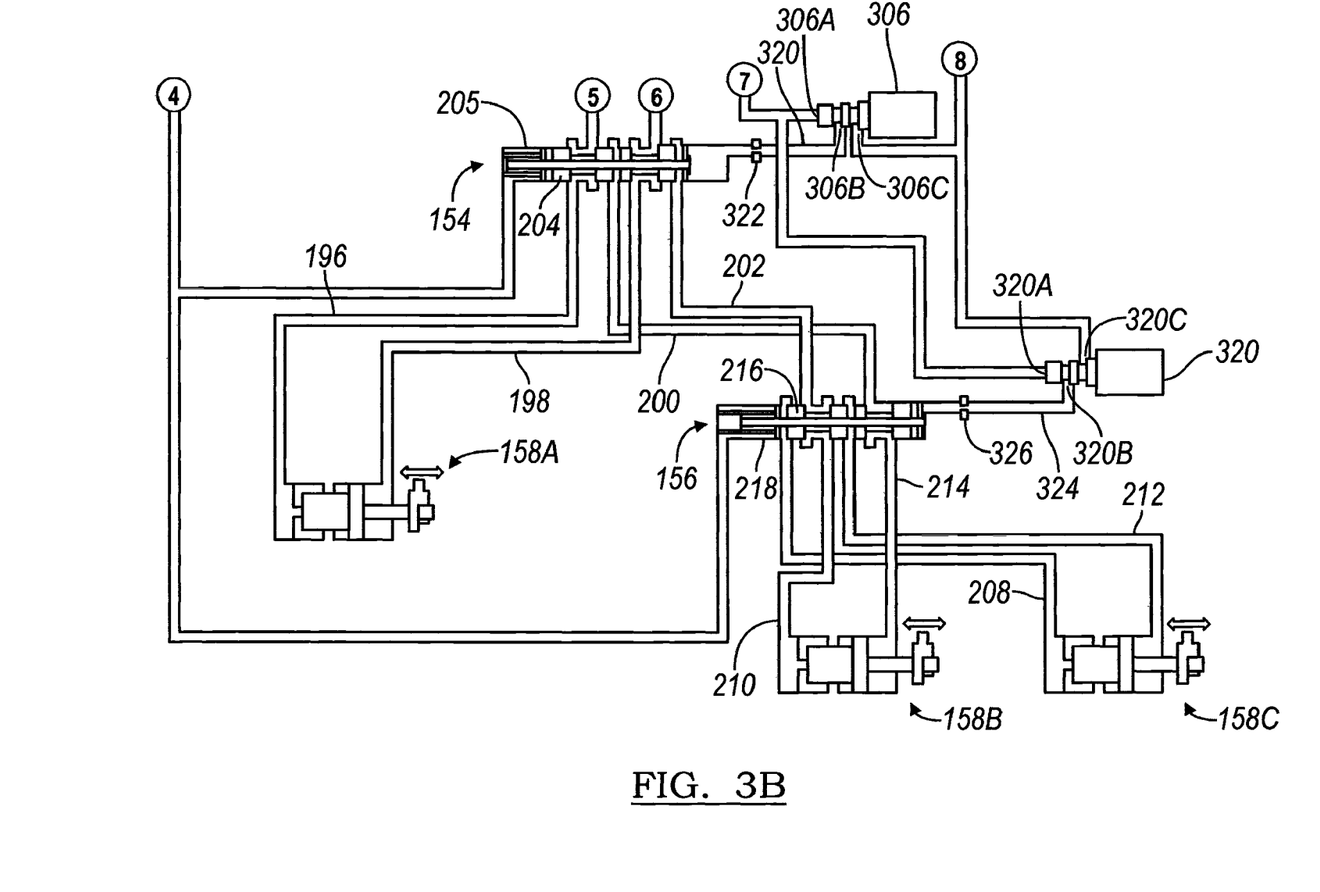

Turning now to FIG. 3, another embodiment of a hydraulic control system is generally indicated by reference number 300. The hydraulic control system 300 is substantially similar to the hydraulic control system 100 described above, and accordingly like components are indicated by like reference numbers. However, the hydraulic control system 300 replaces the direct acting solenoids 206 and 220 with hydraulic control solenoids 306 and 320. Each of the hydraulic control solenoids 306, 320 are in communication with the third manifold 190 via a hydraulic control solenoid supply line 318. Hydraulic control solenoid 306 communicates with the first valve assembly 154 via an actuation line 320. More specifically hydraulic control solenoid 306 is preferably an electrically controlled on/off solenoid. Hydraulic control solenoid 306 includes an inlet port 306A that communicates with an outlet port 306B when hydraulic control solenoid 306 is activated or energized and includes an exhaust port 306C that communicates with the outlet port 306B when hydraulic control solenoid 306 is inactive or de-energized. The inlet port 306A is in communication with the hydraulic control solenoid supply line 318. The outlet port 306B is in communication with actuation line 320. The exhaust port 306C is in communication with the exhaust line 162. A flow restriction orifice 322 is preferably disposed within the actuation line 320 between the hydraulic control solenoid 306 and the first valve assembly 154. The valve 204 is moved to the first position when hydraulic control solenoid 306 communicates pressurized hydraulic fluid 102 from the third manifold 190 through the actuation line 320 and into the first valve assembly 154 where the hydraulic fluid 102 acts upon the valve 204.

Hydraulic control solenoid 320 communicates with the second valve assembly 156 via an actuation line 324. More specifically, hydraulic control solenoid 320 is preferably an electrically controlled on/off solenoid. Hydraulic control solenoid 320 includes an inlet port 320A that communicates with an outlet port 320B when hydraulic control solenoid 320 is activated or energized and includes an exhaust port 320C that communicates with the outlet port 320B when hydraulic control solenoid 320 is inactive or de-energized. The inlet port 320A is in communication with the hydraulic control solenoid supply line 318. The outlet port 320B is in communication with actuation line 324. The exhaust port 320C is in communication with the exhaust line 162. A flow restriction orifice 326 is preferably disposed within the actuation line 324 between the hydraulic control solenoid 320 and the second valve assembly 156. The valve 216 is moved to the first position when hydraulic control solenoid 320 communicates pressurized hydraulic fluid 102 from the third manifold 190 through the actuation line 324 and into the second valve assembly 156 where the hydraulic fluid 102 acts upon the valve 216.

Figure 4A:
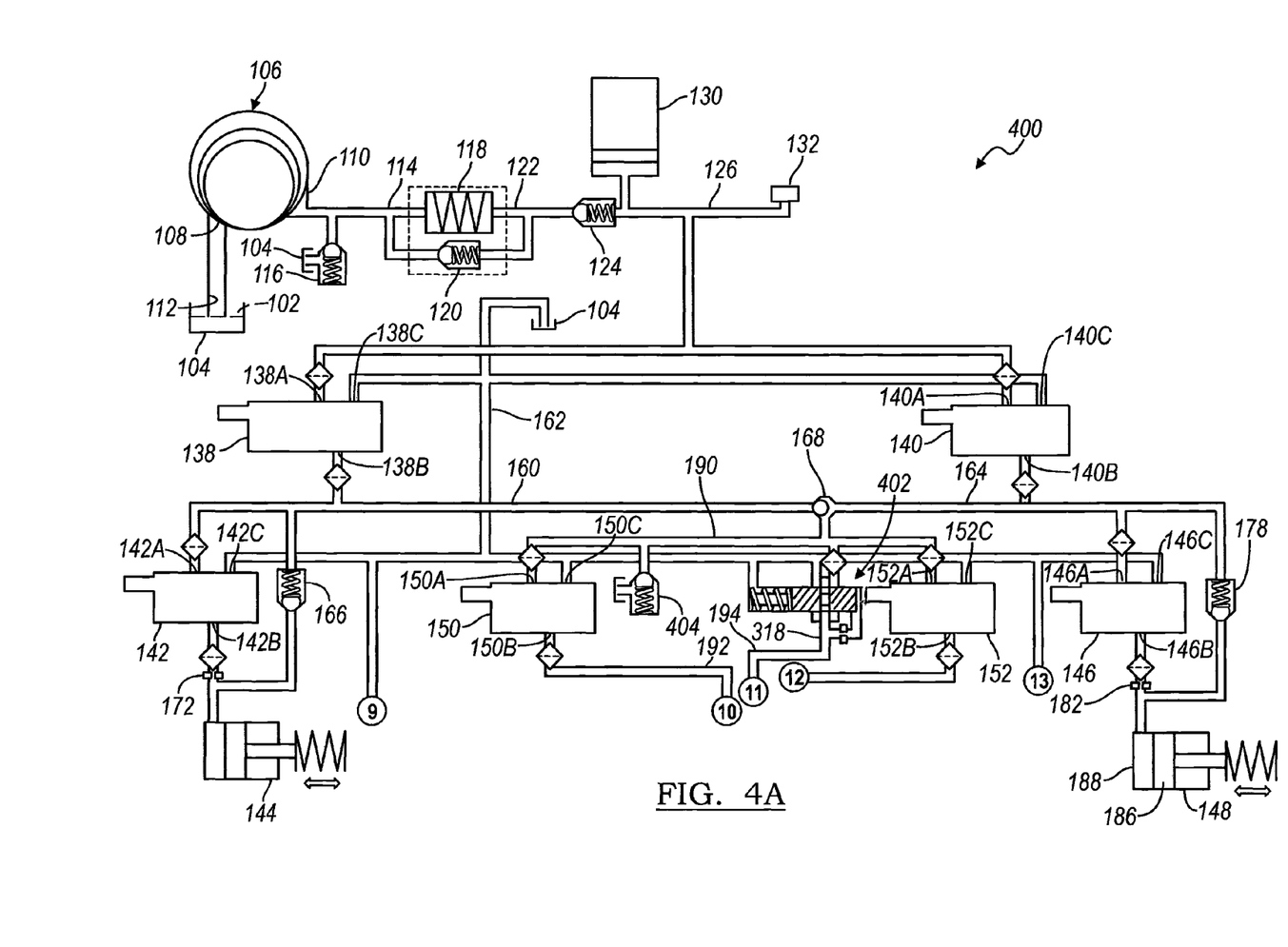
FIG. 4 is a schematic diagram of still another embodiment of a hydraulic control system for a dual clutch transmission according to the principles of the present invention.
Figure 4B:
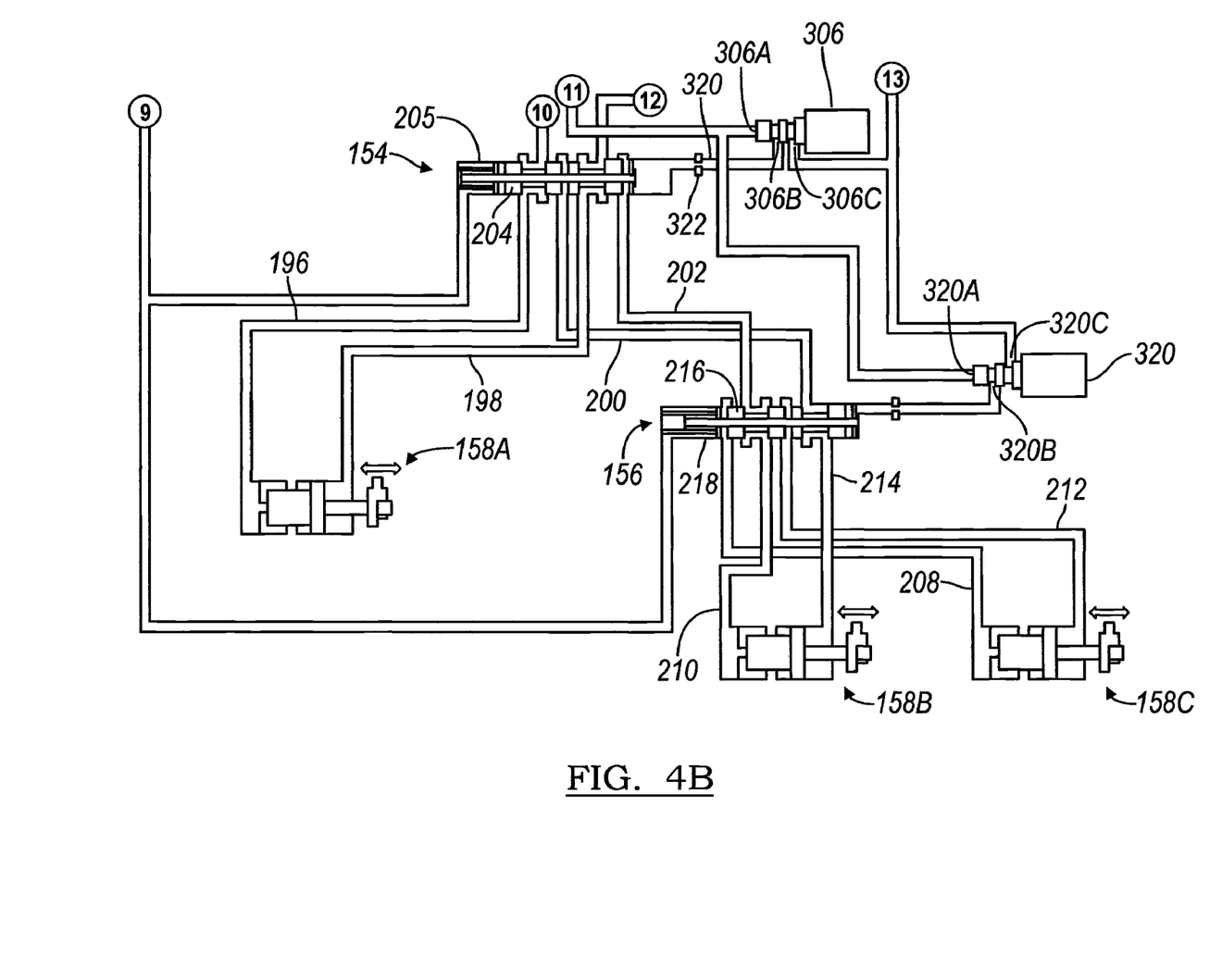

With reference to FIG. 4, another embodiment of a hydraulic control system is generally indicated by reference number 400. The hydraulic control system 400 is substantially similar to the hydraulic control system 300 described above, and accordingly like components are indicated by like reference numbers. However, the hydraulic control system 400 includes an actuator feed valve 402 and a spring biased blow-off safety valve 404. The actuator feed valve 402 is disposed within the hydraulic control solenoid supply line 318 between the third manifold 190 and the hydraulic control solenoids 306, 320. The actuator feed valve 402 is operable to control or limit the pressure of the hydraulic fluid 102 from the third manifold 190 before entering the hydraulic control solenoids 306, 320.

The spring biased blow-off safety valve 404 is in communication with the third manifold 190 and is in communication with the sump 104. The spring biased blow-off safety valve 404 is set at a relatively high predetermined pressure and if the pressure of the hydraulic fluid 102 in the third manifold 190 exceeds this pressure due to pressure build up from the actuator feed valve 402, the safety valve 404 opens momentarily to relieve and reduce the pressure of the hydraulic fluid 102.

Figure 5A:
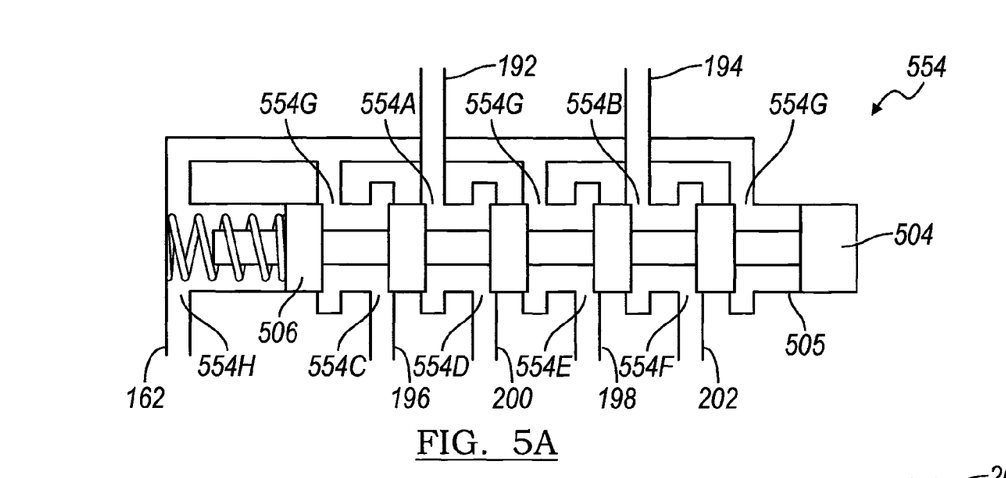
FIG. 5A is a schematic diagram of an alternate valve assembly for use in the hydraulic control system of the present invention.

It should be appreciated that various components within the hydraulic control systems 100, 300, and 400 shown in FIGS. 2-4 may have alternate configurations without departing from the scope of the present invention. For example, with reference to FIG. 5A, an alternate valve assembly is indicated by reference number 554. The valve assembly 554 replaces the first valve assembly 154 shown in FIGS. 2-4. The valve assembly 554 includes a first inlet port 554A, a second inlet port 554B, a first outlet port 554C, a second outlet port 554D, a third outlet port 554E, a fourth outlet port 554F, a plurality of exhaust ports 554G, and a primary exhaust port 554H. The first inlet port 554A is in communication with intermediate line 192. The second inlet port 554B is in communication with intermediate line 194. The first outlet port 554C is in communication with a synchronizer supply line 196. The second outlet port 554D is in communication with a synchronizer supply line 198. The third outlet port 554E is in communication with an intermediate line 200. The fourth outlet port 554F is in communication with an intermediate line 202. The exhaust ports 554G are in communication with the primary exhaust port 554H which in turn is in communication with the exhaust line 162. The valve assembly 554 further includes a valve 504 slidably disposed within a bore 505. The valve 504 is moveable between two positions and includes a plurality of lands 506 that selectively allow communication between the outlet ports 554C-F and the plurality of exhaust ports 554G. The valve assembly 554 may be actuated directly, as described in FIG. 2, or via a hydraulic fluid, as described in FIGS. 3 and 4.

Figure 5B:
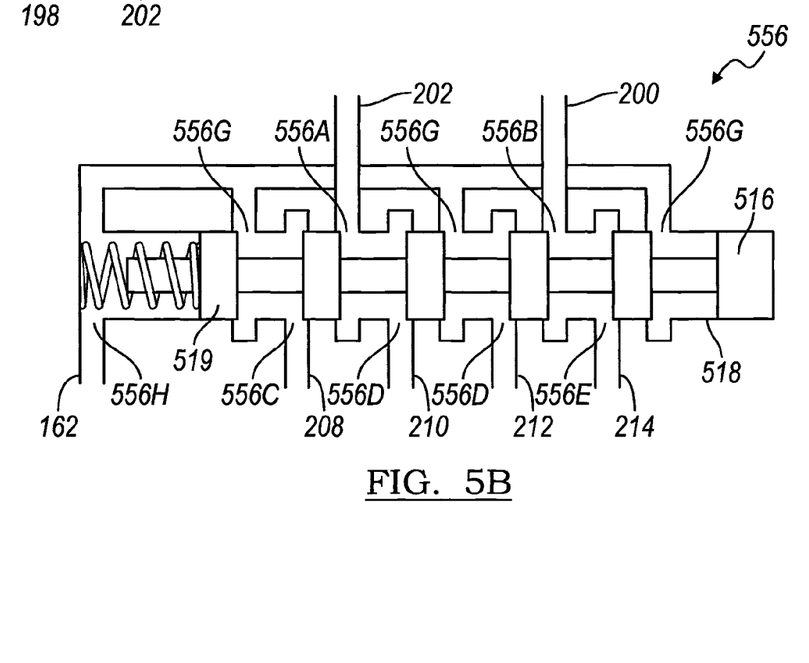
FIG. 5B is a schematic diagram of another alternate valve assembly for use in the hydraulic control system of the present invention.

With reference to FIG. 5B, another alternate valve assembly is indicated by reference number 556. The valve assembly 556 replaces the second valve assembly 156 shown in FIGS. 2-4. The valve assembly 556 includes a first inlet port 556A, a second inlet port 556B, a first outlet port 556C, a second outlet port 556D, a third outlet port 556E, a fourth outlet port 556F, a plurality of an exhaust ports 556G, and a primary exhaust port 556H. The first inlet port 556A is in communication with intermediate line 202. The second inlet port 556B is in communication with intermediate line 200. The first outlet port 556C is in communication with a synchronizer supply line 208. The second outlet port 556D is in communication with a synchronizer supply line 210. The third outlet port 556E is in communication with an intermediate line 212. The fourth outlet port 556F is in communication with an intermediate line 214. The exhaust ports 556G are in communication with the primary exhaust port 556H which in turn is in communication with the exhaust line 162. The valve assembly 556 further includes a valve 516 slidably disposed within a bore 518. The valve 516 is moveable between two positions and includes a plurality of lands 519 that selectively allow communication between the outlet ports 556C-F and the plurality of exhaust ports 556G. The valve assembly 556 may be actuated directly, as described in FIG. 2, or via a hydraulic fluid, as described in FIGS. 3 and 4.

The description of the invention is merely exemplary in nature and variations that do not depart from the general essence of the invention are intended to be within the scope of the invention. Such variations are not to be regarded as a departure from the spirit and scope of the invention.

We claim the following:

1. A hydraulic control system for controlling a dual clutch and a plurality of synchronizers in a transmission, the hydraulic control system comprising:

a source of pressurized hydraulic fluid;

a first pressure control solenoid in downstream fluid communication with the source of pressurized hydraulic fluid;

a second pressure control solenoid in downstream fluid communication with the source of pressurized hydraulic fluid;

a first clutch actuator subsystem in downstream fluid communication with the first pressure control solenoid for selectively actuating the dual clutch;

a second clutch actuator subsystem in downstream fluid communication with the second pressure control solenoid for selectively actuating the dual clutch;

a control device in downstream fluid communication with the first pressure control solenoid and the second pressure control solenoid, the control device operable to selectively communicate hydraulic fluid from whichever of the first and second pressure control solenoids provides a hydraulic fluid having a greater pressure;

a first synchronizer solenoid in downstream fluid communication with the control device;

a second synchronizer solenoid in downstream fluid communication with the control device;

a first valve in downstream fluid communication with the first and second synchronizer solenoids;

a second valve in downstream fluid communication with the first valve; and a plurality of actuators operable to selectively actuate the plurality of synchronizers, wherein at least a first of the plurality of actuators is in downstream fluid communication with the first valve and at least a second and a third of the plurality of actuators is in downstream fluid communication with the second valve.

2. The hydraulic control system of claim 1 wherein the first and second pressure control solenoids are operable to control a pressure of hydraulic fluid that is communicated to the first and second clutch actuation systems and the control device.

3. The hydraulic control system of claim 1 wherein the first and second synchronizer solenoids are operable to control a pressure of hydraulic fluid that is communicated from one of the first and second pressure control solenoids to the first valve.

4. The hydraulic control system of claim 1 wherein the first valve is operable to selectively communicate hydraulic fluid from the first and second synchronizer solenoids to the first of the plurality of actuators and to the second valve.

5. The hydraulic control system of claim 1 wherein the second valve is operable to selectively communicate hydraulic fluid from the first valve to the second of the plurality of actuators and to the third of the plurality of actuators.

6. The hydraulic control system of claim 1 wherein the first clutch actuation subsystem includes a first clutch solenoid in downstream fluid communication with the first pressure control solenoid and a first clutch actuator in downstream fluid communication with the first clutch solenoid for selectively actuating the dual clutch, and wherein the second clutch actuation subsystem includes a second clutch solenoid in downstream fluid communication with the second pressure control solenoid and a second clutch actuator in downstream fluid communication with the second clutch solenoid for selectively actuating the dual clutch.

7. The hydraulic control system of claim 1 wherein the control device is a check valve assembly having a first input in fluid communication with the first pressure control solenoid, a second input in fluid communication with the second pressure control solenoid, and an output in fluid communication with the first and second synchronizer solenoids.

8. The hydraulic control system of claim 1 wherein the first valve includes a first input in fluid communication with the first synchronizer solenoid, a second input in fluid communication with the second synchronizer solenoid, a first output, a second output, a third output, and a fourth output, wherein the second valve includes a first input in fluid communication with the fourth output of the first valve, a second input in fluid communication with the second output of the first valve, a first output, a second output, a third output, and a fourth output; and wherein the first of the plurality of actuators is in fluid communication with the first and third outputs of the first valve, the second of the plurality of actuators is in fluid communication with the second and fourth outputs of the second valve, and the third of the plurality of actuators is in fluid communication with the first and third outputs of the second valve.

9. The hydraulic control system of claim 8 wherein the first valve is operable to communicate hydraulic fluid from the first synchronizer solenoid to the first output and to communicate hydraulic fluid from the second synchronizer solenoid to the third output when the first valve is in a first position and wherein the first valve is operable to communicate hydraulic fluid from the first synchronizer solenoid to the second output and to communicate hydraulic fluid from the second synchronizer solenoid to the fourth output when the first valve is in a second position.

10. The hydraulic control system of claim 9 wherein the second valve is operable to communicate hydraulic fluid from the fourth output of the first valve to the first output and to communicate hydraulic fluid from the second output of the first valve to the third output when the second valve is in a first position and wherein the second valve is operable to communicate hydraulic fluid from the fourth output of the first valve to the second output and to communicate hydraulic fluid from the second output of the first valve to the fourth output when the second valve is in a second position.

11. The hydraulic control system of claim 10 wherein the first of the plurality of actuators includes a first port in fluid communication with the first output of the first valve and a second port in fluid communication with the third output of the first valve, wherein the second of the plurality of actuators includes a first port in fluid communication with the second output of the second valve and a second port in fluid communication with the fourth output of the second valve, and wherein the third of the plurality of actuators includes a first port in fluid communication with the first output of the second valve and a second port in fluid communication with the third output of the second valve.

12. A hydraulic control system for controlling a dual clutch and a plurality of synchronizers in a transmission, the hydraulic control system comprising:

a source of pressurized hydraulic fluid;

a first pressure control solenoid in downstream fluid communication with the source of pressurized hydraulic fluid;

a second pressure control solenoid in downstream fluid communication with the source of pressurized hydraulic fluid;

a first clutch actuator subsystem in downstream fluid communication with the first pressure control solenoid for selectively actuating the dual clutch;

a second clutch actuator subsystem in downstream fluid communication with the second pressure control solenoid for selectively actuating the dual clutch;

a control device in downstream fluid communication with the first pressure control solenoid and the second pressure control solenoid, the control device operable to selectively communicate hydraulic fluid from whichever of the first and second pressure control solenoids provides a hydraulic fluid having a greater pressure;

a first synchronizer solenoid in downstream fluid communication with the control device;

a second synchronizer solenoid in downstream fluid communication with the control device;

a first valve having a first input in fluid communication with the first synchronizer solenoid, a second input in fluid communication with the second synchronizer solenoid, a first output, a second output, a third output, and a fourth output;

a second valve having a first input in fluid communication with the fourth output of the first valve, a second input in fluid communication with the second output of the first valve, a first output, a second output, a third output, and a fourth output;

a first actuator for actuating one of the plurality of synchronizers, wherein the first actuator includes a first port in fluid communication with the first output of the first valve and a second port in fluid communication with the third output of the first valve;

a second actuator for actuating one of the plurality of synchronizers, wherein the second actuator includes a first port in fluid communication with the second output of the second valve and a second port in fluid communication with the fourth output of the second valve; and third actuator for actuating one of the plurality of synchronizers, wherein the third actuator includes a first port in fluid communication with the first output of the second valve and a second port in fluid communication with the third output of the second valve, wherein the first valve is operable to communicate hydraulic fluid from the first synchronizer solenoid to the first output and to communicate hydraulic fluid from the second synchronizer solenoid to the third output when the first valve is in a first position and wherein the first valve is operable to communicate hydraulic fluid from the first synchronizer solenoid to the second output and to communicate hydraulic fluid from the second synchronizer solenoid to the fourth output when the first valve is in a second position, and wherein the second valve is operable to communicate hydraulic fluid from the fourth output of the first valve to the first output and to communicate hydraulic fluid from the second output of the first valve to the third output when the second valve is in a first position and wherein the second valve is operable to communicate hydraulic fluid from the fourth output of the first valve to the second output and to communicate hydraulic fluid from the second output of the first valve to the fourth output when the second valve is in a second position.

13. The hydraulic control system of claim 12 wherein the first and second pressure control solenoids are operable to control a pressure of hydraulic fluid that is communicated to the first and second clutch actuation systems and the control device.

14. The hydraulic control system of claim 12 wherein the first and second synchronizer solenoids are operable to control a pressure of hydraulic fluid that is communicated from one of the first and second pressure control solenoids to the first valve.

15. The hydraulic control system of claim 12 wherein the first clutch actuation subsystem includes a first clutch solenoid in downstream fluid communication with the first pressure control solenoid and a first clutch actuator in downstream fluid communication with the first clutch solenoid for selectively actuating the dual clutch, and wherein the second clutch actuation subsystem includes a second clutch solenoid in downstream fluid communication with the second pressure control solenoid and a second clutch actuator in downstream fluid communication with the second clutch solenoid for selectively actuating the dual clutch.

16. The hydraulic control system of claim 12 wherein the control device is a check valve assembly having a first input in fluid communication with the first pressure control solenoid, a second input in fluid communication with the second pressure control solenoid, and an output in fluid communication with the first and second synchronizer solenoids.

17. The hydraulic control system of claim 12 wherein the first valve is moved between the first and second positions by a first direct acting solenoid and the second valve is moved between the first and second positions by a second direct acting solenoid.

18. The hydraulic control system of claim 12 further comprising a first solenoid in downstream fluid communication with the control device, wherein the first solenoid is operable to communicate pressurized hydraulic fluid to the first valve to move the first valve between the first and second positions, and further comprising a second solenoid in downstream fluid communication with the control device, wherein the second solenoid is operable to communicate pressurized hydraulic fluid to the second valve to move the second valve between the first and second positions.

19. The hydraulic control system of claim 18 further comprising a feed limit valve disposed between the control device and the first and second solenoids, wherein the feed limit valve is operable to control a pressure of the hydraulic fluid communicated from the control device before entering the first and second solenoids, and further comprising a spring biased blow-off safety valve disposed in parallel relationship with the feed limit valve, wherein the spring biased blow-off safety valve is set at a predetermined pressure, and wherein if the pressure of the hydraulic fluid between the control device and the feed limit valve exceeds the predetermined pressure the spring biased blow-off safety valve opens momentarily to reduce the pressure of the hydraulic fluid.

20. The hydraulic control system of claim 12 wherein the source of pressurized hydraulic fluid includes a pump and an accumulator.

21. A hydraulic control system for controlling a dual clutch and a plurality of synchronizers in a transmission, the hydraulic control system comprising:

a source of pressurized hydraulic fluid;

a first pressure control solenoid having an input and an output, wherein the input is in fluid communication with the source of pressurized hydraulic fluid;

a second pressure control solenoid having an input and an output, wherein the input is in fluid communication with the source of pressurized hydraulic fluid;

a first clutch solenoid having an input and an output, wherein the input is in fluid communication with the output of the first pressure control solenoid;

a second clutch solenoid having an input and an output, wherein the input is in fluid communication with the output of the second pressure control solenoid;

a first clutch actuator in fluid communication with the output of the first clutch solenoid for selectively actuating the dual clutch;

a second clutch actuator in fluid communication with the output of the second clutch solenoid for selectively actuating the dual clutch;

a check valve assembly having a first input in fluid communication with the output of the first pressure control solenoid, a second input in fluid communication with the output of the second pressure control solenoid, and an output, wherein the check valve assembly is operable to selectively communicate hydraulic fluid to the output from whichever of the first and second pressure control solenoids provides a hydraulic fluid having a greater pressure to the first and second inputs;

a first synchronizer solenoid having an input and an output, wherein the input is in fluid communication with the output of the check valve assembly;

a second synchronizer solenoid having an input and an output, wherein the input is in fluid communication with the output of the check valve assembly;

a first valve having a first input in fluid communication with the output of the first synchronizer solenoid, a second input in fluid communication with the output of the second synchronizer solenoid, a first output, a second output, a third output, and a fourth output;

a second valve having a first input in fluid communication with the fourth output of the first valve, a second input in fluid communication with the second output of the first valve, a first output, a second output, a third output, and a fourth output;

a first actuator for actuating one of the plurality of synchronizers, wherein the first actuator includes a first port in fluid communication with the first output of the first valve and a second port in fluid communication with the third output of the first valve;

a second actuator for actuating one of the plurality of synchronizers, wherein the second actuator includes a first port in fluid communication with the second output of the second valve and a second port in fluid communication with the fourth output of the second valve; and a third actuator for actuating one of the plurality of synchronizers, wherein the third actuator includes a first port in fluid communication with the first output of the second valve and a second port in fluid communication with the third output of the second valve, wherein the first valve is operable to communicate hydraulic fluid from the first synchronizer solenoid to the first output and to communicate hydraulic fluid from the second synchronizer solenoid to the third output when the first valve is in a first position and wherein the first valve is operable to communicate hydraulic fluid from the first synchronizer solenoid to the second output and to communicate hydraulic fluid from the second synchronizer solenoid to the fourth output when the first valve is in a second position, and wherein the second valve is operable to communicate hydraulic fluid from the fourth output of the first valve to the first output and to communicate hydraulic fluid from the second output of the first valve to the third output when the second valve is in a first position and wherein the second valve is operable to communicate hydraulic fluid from the fourth output of the first valve to the second output and to communicate hydraulic fluid from the second output of the first valve to the fourth output when the second valve is in a second position.

* * * * *